United States Patent
Patterson et al.

(10) Patent No.: US 6,356,684 B1
(45) Date of Patent: Mar. 12, 2002

(54) ADJUSTABLE OPTICAL FIBER GRATING DISPERSION COMPENSATORS

(75) Inventors: David Brian Patterson, Succasunna; Brian Charles Moore, Morristown, both of NJ (US)

(73) Assignee: General Dynamics Advanced Technology Systems, Inc., Greensboro, NC (US)

( * ) Notice: Subject to any disclaimer, the term of this patent is extended or adjusted under 35 U.S.C. 154(b) by 0 days.

(21) Appl. No.: 09/548,977

(22) Filed: Apr. 14, 2000

(51) Int. Cl.⁷ .............................. G02B 6/34; H04B 10/00
(52) U.S. Cl. .......................... 385/37; 385/24; 385/31; 385/123; 359/130; 359/161; 359/153
(58) Field of Search ..................... 385/31, 37, 123, 385/24, 10, 4, 13; 359/127, 130, 153, 161, 173

(56) References Cited

U.S. PATENT DOCUMENTS

| | | | | |
|---|---|---|---|---|
| 4,749,248 A | * | 6/1988 | Aberson, Jr. et al. | 385/37 X |
| 5,007,705 A | | 4/1991 | Morey et al. | 385/37 X |
| 5,058,977 A | * | 10/1991 | Sorin | 385/30 |
| 5,420,948 A | | 5/1995 | Byron | 385/37 |
| 5,469,520 A | | 11/1995 | Morey et al. | 385/37 |
| 5,557,468 A | * | 9/1996 | Ip | 359/615 |
| 5,602,949 A | | 2/1997 | Epworth | 385/37 |
| 5,671,307 A | | 9/1997 | Lauzon et al. | 385/37 |
| 5,717,510 A | | 2/1998 | Ishikawa et al. | 359/161 |
| 5,718,738 A | | 2/1998 | Kohnke et al. | 65/31 |
| 5,754,322 A | | 5/1998 | Ishikawa et al. | 359/135 |
| 5,815,294 A | | 9/1998 | Ishikawa et al. | 359/110 |
| 5,861,970 A | | 1/1999 | Tatham et al. | 359/161 |
| 5,870,213 A | | 2/1999 | Ishikawa et al. | 359/135 |
| 5,896,217 A | | 4/1999 | Ishikawa et al. | 359/189 |
| 5,909,297 A | | 6/1999 | Ishikawa et al. | 359/161 |
| 5,999,289 A | | 12/1999 | Ihara et al. | 359/124 |
| 6,055,081 A | * | 4/2000 | Koyano et al. | 359/161 |
| 6,081,360 A | | 6/2000 | Ishikawa et al. | 359/161 |
| 6,154,588 A | * | 11/2000 | Kai | 385/27 |
| 6,157,477 A | * | 12/2000 | Robinson | 359/161 |
| 6,222,957 B1 | * | 4/2001 | Lin et al. | 385/24 |
| 6,282,341 B1 | * | 8/2001 | Digonnet et al. | 385/37 |
| 6,292,601 B1 | * | 9/2001 | Laming et al. | 385/24 |

OTHER PUBLICATIONS

Eggleton, Benjamin J. Dispersion compensation over 100 km at Gbit/s using a fiber grating in transmission. Electronics Letters, 1996, vol. 32, p. 1610.

Litchinitser, Natalia M., et al. Fiber bragg gratings for dispersion compensation in transmission; theoretical model and design criteria for nearly ideal pulse recompression. Journal of Lightwave Technology, Aug. 1997, vol. 15(8), pp. 1303–1313.

Litchinitser, Natalia M., et al. Analysis of fiber bragg gratings for dispersion compensation in reflective and transmissive geometries. Journal of Lightwave Technology, Aug. 1997, vol. 15(8), pp. 1323–1328.

* cited by examiner

*Primary Examiner*—Brian Healy
(74) *Attorney, Agent, or Firm*—Moore & Van Allen PLLC; Stephen B. Phillips

(57) ABSTRACT

Adjustable optical fiber grating dispersion compensators. The invention provides a fully tunable dispersion compensator with a wide dynamic range. Dispersion compensators according to the invention are based on uniform fiber Bragg grating technology. Individual gratings are tuned so that the gratings, which normally operate in reflection mode, operate in transmission mode with the frequency of interest falling just outside a reflection band edge. Gratings are combined to provide broadband, or multiple-wavelength dispersion. Tuning is provided via transducers coupled to the gratings. A control system can be connected to the transducers to provide a control signal so that the frequencies of the gratings can be dynamically tuned. The control system operates by measuring signals from opto-electronic detectors. The signals are used to determine a fractional spectral power transmitted through a filter. The fractional spectral power is related to the amount of dispersion present in the optical path of the network.

26 Claims, 8 Drawing Sheets

ADJUSTABLE OPTICAL FIBER GRATING DISPERSION COMPENSATORS

BACKGROUND

1. Field of the Invention

This invention relates to dispersion compensation in optical networks. More specifically, the invention relates to the use of uniform fiber Bragg gratings to provide dispersion compensation. The wavelength of light for which the dispersion compensation is provided by a grating may be dynamically controlled.

2. Description of the Problem

Dispersion compensation is a well-known technique for increasing the usable bandwidth of long-haul fiber systems that suffer from limitations caused by pulse broadening due to chromatic dispersion. Without dispersion compensation, a pulse, upon propagation through a dispersive system, will accumulate a phase chirp, leading to a broadening of pulses in the time-domain. The broadening of pulses in a data string then produces overlap of adjacent pulses and resulting detection errors at the receiver. An example of such broadening is shown in FIGS. 1 and 2, where eye diagrams of a non-dispersed, and a dispersion-broadened data string are shown. An eye diagram is a synchronous measurement of the received signal, where signals from multiple bit intervals are plotted over one another. Undistorted transmission leads to "open eyes," where the binary zero and one signals are clearly separated during the measurement interval as in FIG. 1, while dispersion-induced broadening leads to "closed eyes" as in FIG. 2. U.S. Pat. No. 5,861,970 issued Jan. 19, 1999 provides a good discussion of dispersion in optical networks and is incorporated herein by reference.

Dispersion within an optical network can be measured in a number of ways. U.S. Pat. Nos. 5,717,510, issued Feb. 10, 1998, and 5,815,294, issued Sep. 29, 1998, address the monitoring of specific signal characteristics, and are incorporated herein by reference. The monitoring systems discussed in these patents, as well as some other known monitoring systems, require synchronous detection of data with subsequent processing. Such systems provide accurate results, but require large amounts of storage and processing hardware, making them complex and expensive.

Two methods for dispersion compensation are currently used in practical systems. In the first method, dispersion compensators, formed by long lengths of optical fiber (with dispersion properties that cancel the dispersion characteristics of the transmission channel), are placed at strategic points in the network to keep the dispersion within limits, and at the receiver to reduce accumulated dispersion. At the receiver, careful adjustment of fiber lengths is necessary to match these characteristics at a specific wavelength for a specific system. Adjustment is made by switching long lengths of fiber into or out of the compensator. The long lengths necessary for this component introduce signal attenuation, so an optical amplifier is typically needed to offset this loss.

The second currently employed method uses linearly chirped fiber Bragg gratings. Here, the period of a fiber grating is varied linearly with distance, with a mean period that approximately satisfies the Bragg condition for strong reflection at the optical wavelength of interest. The linearly-varying period imparts chromatic dispersion on the reflected pulse which can be used to compensate for accumulated dispersion in long-haul signal propagation. These components typically operate over a narrow bandwidth, and the amount of dispersion compensation, which depends on the grating length, chirp parameter, and index modulation depth, cannot be adjusted easily. Various aspects of the fabrication and use of chirped fiber Bragg gratings are described in U.S. Pat. No. : 5,420,948, issued May 30, 1995; U.S, Pat. No. 5,602,949, issued Feb. 11, 1997; and U.S. Pat. No. 5,718, 738, issued Feb. 17, 1998; all of which are incorporated herein by reference.

An alternative technique is the use of a uniform fiber Bragg grating in transmission. It is known that a pulse propagating at a wavelength just outside the reflection band of a grating structure undergoes significant chromatic dispersion. This effect was observed in the paper, F. Ouellette, *Optics Letters*, vol. 29, no. 32, pp. 4826–4829, 1990. Use of this technique for dispersion compensation has been suggested in the articles: B. Eggleton, et al., *Electronics Letters*, vol. 32, p.1610, 1996; N. Litchinitser, et al, *Journal of Lightwave Technology*, vol. 15, pp. 1323–1328, 1997; and N. Litchinitser, et al., *Journal of Lightwave Technology*, vol.15, pp.1303–1313. These papers demonstrated the effectiveness of this technique for a single, fixed wavelength in a particular system geometry. Examples of the power transmission and dispersion versus wavelength for a uniform grating are shown in FIGS. 3 and 4. At wavelengths slightly longer than the long-wavelength reflection band edge of the grating, negative dispersion is produced, while at wavelengths below the short-wavelength reflection band edge, positive dispersion is provided. For large dispersion magnitudes (greater than 1000 ps/nm), a large index modulation (greater than 0.001) and a long grating (greater than 10 cm) are typically required. In addition, proper apodization (i.e., smoothing of the profile at the grating edges) is necessary to remove sidelobe structure present in a uniform grating. The graphs in FIGS. 3 and 4 are for a grating of 10 cm in length with a refractive index of 0.0018 and super-Gaussian apodization. It should be emphasized that dispersion compensation by chirped gratings is achieved through reflection, whereas dispersion compensation by uniform gratings is achieved through transmission, two very different mechanisms that exhibit markedly different physics.

A related technology is that of strain-tuned fiber gratings. It is known that the resonant wavelength of an individual fiber grating may be tuned by either tensile strain (i.e., stretching) or compressive strain. Several techniques have been proposed for producing tensile strain, including thermal and piezo-electrical mechanisms. U.S. Pat. Nos. 5,007, 705, issued Apr. 16, 1991 and 5,469,520, issued Nov. 21, 1995 describe tensile and compressive strain tuning, respectively, and are incorporated herein by reference. Strain tuning has been applied to a uniform grating used for filtering and to a chirped grating used for dispersion compensation.

Present dispersion compensation methods, as described above, have several shortfalls. Dispersion compensators formed by long lengths of compensating fiber are cumbersome and their properties can only be changed in discrete steps since change is accomplished by switching lengths of fiber in and out of the compensator. A chirped fiber Bragg grating has a narrow bandwidth, and even if strain tuned, is only adjustable over a small range. Additionally, a chirped grating typically requires a length on the order of meters for full compensation. A uniform fiber Bragg grating only provides dispersion when the incident wavelength is just outside a reflection band edge, and therefore, it is difficult to manufacture such a grating precisely enough to provide the required compensation, and difficult to maintain the dispersive characteristic, even with strain tuning. What is needed is a way to provide a reliable, fully adjustable (tunable), broadband dispersion compensator with a wide dynamic range. Additionally, such a compensator could be enhanced through the development of a monitoring and control system that monitors dispersion asynchronously and controls dispersion compensating elements using relatively inexpensive hardware.

SUMMARY

This invention solves the above-described problem by providing a fully tunable dispersion compensator with a wide dynamic range in dispersion. The dispersion compensator according to the invention is based on tuned uniform fiber Bragg grating technology. By small adjustments of grating period, dispersion magnitude may be varied from zero to values of 2000 ps/nm or higher for a given wavelength, depending on grating length. The gratings employed in this invention require lengths of 5–20 cm for full compensation. Additionally, a control signal input is provided for a transducer that is coupled to a grating, so that precise control, including feedback control, can be used to tune the gratings to maintain the appropriate characteristics. A single compensation element can be used to provide dispersion compensation at a single frequency. Or, multiple elements can be linked together in series or parallel to provide a multiple wavelength or broadband optical dispersion compensator. A highly efficient, low-cost, dispersion monitoring and control system for the dispersion compensators of the invention is also disclosed.

When we use the terms "tuned" or "tuning" or words like "adjustable" with respect to a uniform fiber Bragg grating, we refer to the act or process of adjusting the grating periodicity to provide optimum dispersion compensation. Our use of these words is independent of whether this is done by a manual or automatic process and independent of whether it is done one time, prior to a grating being put into use, or done continuously while the grating is in operation. When we refer to the grating as being "dynamically tuned" or "dynamically adjusted" we are referring specifically to the act or process of adjusting the grating while it is in operation to maintain the appropriate characteristics, whether this is done manually or through the use of a control system using feedback principles.

In order to describe our invention, we describe, in this disclosure, multiple example embodiments. According to one embodiment, an adjustable, optical dispersion-compensating element is provided for compensation at a single frequency. The element includes a uniform fiber Bragg grating and a transducer coupled to the uniform fiber Bragg grating to deform the uniform fiber Bragg grating in response to a control signal. Dispersion is provided for a dynamically selectable wavelength of light being transmitted through the optical path by transmission just outside a reflection band edge of the uniform fiber Bragg grating. Compensation by this element can be for negative or positive group velocity dispersion by selecting the transmission point to be just outside either the short or long wavelength end of the reflection band.

According to other embodiments of the invention, multiple dispersion compensating elements as described above can be connected together and coupled to optical fiber connectors and other components to create multiple-wavelength or broadband optical dispersion compensators. In one type of compensator, a plurality of cascaded uniform fiber Bragg gratings are connected between input and output connectors, each uniform fiber Bragg grating for compensating for dispersion at a specific wavelength. Light at other wavelengths is well outside the reflection band of a specific grating, and is transmitted through the system, to be compensated for by a different grating.

In another type of compensator an optical circulator is provide which has connections for input and output optical fibers and for one or more uniform fiber Bragg gratings, each to compensate for dispersion at a specific wavelength. A transducer is coupled to a grating, and the transducer is responsive to a control signal so that the specific wavelength for the uniform fiber Bragg grating can be dynamically changed. If there is only one grating, a reflection element is connected to reflect the light back to the uniform fiber Bragg grating and to the optical circulator. Upon being reflected back through the grating, further dispersion compensation is provided. If there are multiple gratings with transducers, the gratings work in pairs. The first grating of a pair is tuned so that light of the specific wavelength is transmitted through the grating slightly outside the reflection band edge so that compensation is provided. The second uniform fiber Bragg grating of the pair is tuned so that the light is reflected back to the first uniform fiber Bragg grating and to the optical circulator. If the wavelengths are chosen carefully, gratings before the pair simply pass the unselected wavelengths through the system. A final reflection element is needed to reflect the final wavelength back through the system. This can be a final grating or simply a mirror.

Another embodiment of the invention involves connecting the uniform fiber Bragg gratings in parallel. In this case, an N-wavelength optical dispersion compensator is built by connecting N parallel, uniform fiber Bragg gratings between a demultiplexer and the multiplexer, each uniform fiber Bragg grating for compensating for dispersion at a specific wavelength as described earlier. When the demultiplexer receives a broadband signal having multiple wavelengths, the signal is split into individual streams of light pulses, each at a different wavelength. Each signal is passed through the appropriate grating just outside the reflection band edge as before, and the signals are reassembled by an N by 1 multiplexer. The demultiplexer and multiplexer have optical fiber connectors for connection within an optical fiber network. All the embodiments of the invention fundamentally operate the same way. Light waves at one or more selected wavelengths are received from an input. Dispersion compensation is provided at each of the selected wavelengths by passing light of the selected wavelength through a uniform fiber Bragg grating that is tuned so that the selected wavelength is slightly outside a reflection band edge of the grating, and the light is transmitted to an output. Multiple gratings can be connected together, and reflection and/or circulation and retransmission techniques can be used to provide additional compensation. The arrangements of components described provide the means to achieve a fully tunable dispersion compensator with a wide dynamic range in dispersion.

A control system can be connected to control signal inputs for the transducers used in the dispersion compensators described above. A control block is connected to the control signal inputs and receives signals from RF detectors that are connected to an opto-electronic receiver or converter. One RF detector measures spectral power directly, while another measures it after being passed through a filter. The signals from the detectors are used to determine a fractional spectral power transmitted through the filter. The details of the determination depend on the type of filter being used, that is whether the filter is a low-pass, high-pass, or band-pass filter. Measurements can be made in-line via an optical tap, or at a termination, in which case the opto-electronic receiver can be part of the data/clock recovery system for the optical network.

DETAILED DESCRIPTION

Figure 5:
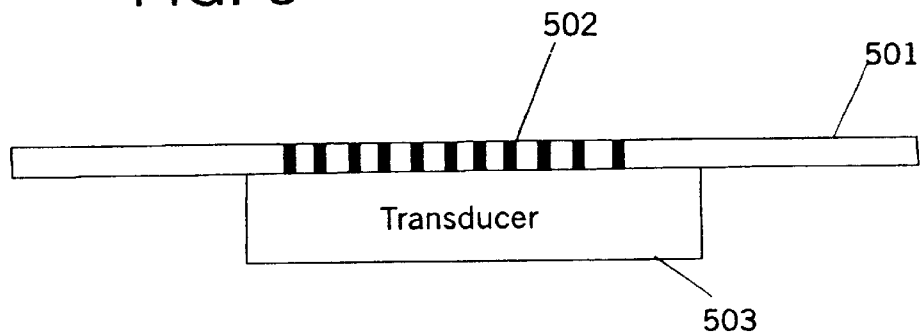
FIG. 5 shows a tunable, single-wavelength, dispersion compensating element according to the present invention.

FIG. 5 illustrates a single wavelength, dispersion compensating element according to the present invention. In FIG. 5, a uniform Bragg grating, 502, is built into an optical fiber, 501, to form a uniform fiber Bragg grating (FBG). A transducer, 503 is provided to tune the grating. Although the FBG is normally operated in reflection, strong dispersion effects may be obtained in transmission just outside the reflection to band edge. A transducer according to the invention provides either tensile or compressive strain, or causes other physical changes in the grating, in response to a control signal. There are many types of transducers that can be used with the invention. A transducer for the compensator element may employ any one of temperature, piezoelectricity, magnetostriction, or physical deformation to produce tensile or compressive strain in the fiber, thus modifying the period of the grating. Thermal tuning can be accomplished by deposition of a metal strip directly onto the optical fiber and using current-generated heat to produce a change in the fiber. Piezoelectric and magnetostrictive materials can impart a strain in response to applied electric and magnetic fields, respectively. Other physical deformations that may be used include manual mechanical actuators and motor-driven actuators to produce strains up to a few percent in the optical fiber. Such strains have been observed to shift the grating spectrum by greater than 40 nm.

The dispersion of an optical element arises from a wavelength dependence in the propagation time through the element. Our invention corrects for this dispersion by placing another element with the opposite dispersion characteristics in series with the dispersive fiber. A periodic structure, such as an FBG, creates a time delay, and therefore dispersion, that is a highly nonlinear function of wavelength. The dispersive properties of a uniform grating depend on the grating length, index modulation depth, apodization (i.e., tapering of the profile at the edges to reduce edge reflection effects), and wavelength detuning from the reflection band edge of the grating. For a pulse with center wavelength slightly detuned from the band edge, one may obtain nearly ideal compensation after propagation through a long length of optical fiber. To achieve negative dispersion (i.e., to compensate for positive fiber dispersion) one must operate at wavelengths slightly (e.g., one nanometer or less) above the long-wavelength band edge, while to achieve positive dispersion, one operates slightly below the short-wavelength band edge.

Figure 6:
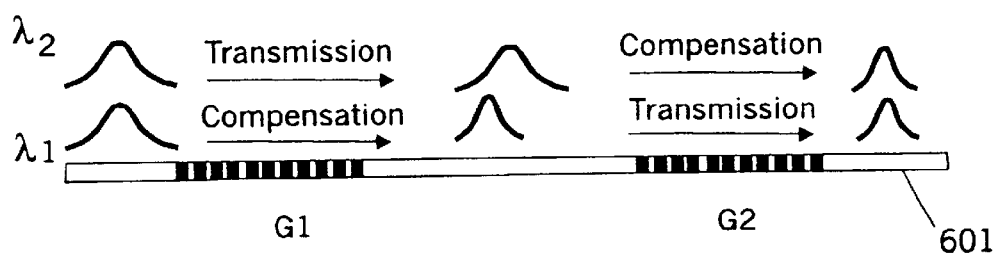
FIG. 6 shows a two-wavelength optical dispersion compensator where all gratings operate completely in transmission mode according to the present invention.

The compensation element shown in FIG. 5 provides dispersion compensation for light pulses of a single wavelength. However, with dense wavelength division multiplexing (DWDM), many channels or transmission signals independent of each other are sent over the same line or optical fiber by multiplexing within the domain of optical frequencies. The transmitted channels are distinguishable from each other because each of them is associated with a specific frequency or wavelength. With a DWDM system, dispersion compensation is required at multiple frequencies. One solution to this problem is illustrated in FIG. 6. In FIG. 6, and throughout the rest of this disclosure, the transducers are not shown for the sake of simplicity. In FIG. 6, gratings are cascaded in series, without regard to the specific order of the gratings. By way of example, FIG. 6 shows gratings G1 and G2 cascaded within an optical fiber path, 601. Dispersed light at wavelengths $\lambda_1$ and $\lambda_2$ enters the fiber at the left. Light pulses of wavelength $\lambda_1$ are dispersion compensated by G1, but fall well outside the reflection band of G2 and are simply forwarded through the network. Light pulses of wavelength $\lambda_2$ fall well outside the reflection band of G1 and are forwarded to G2. More gratings can be added to the dispersion compensator of FIG. 6 to handle more wavelengths. In any case, each wavelength falls just outside the reflection band of its own grating and well outside the reflection band of other gratings so that light of a given wavelength is only affected by its own grating. This approach may be used for large channel separations (e.g., greater than 2 nm), where the operating wavelength of a grating is well outside the reflection band and region of large dispersion of any other grating. This precise approach will not work, however for close channel spacing such as 50 GHz or 100 GHz, where the region of strong dispersion of one grating lies within the reflection band of an adjacent channel's grating. It is possible in such a situation to build a system with compensators as described above by using one or more interleavers or spectral slicers. Each such component will split the optical channel into two paths, with alternate wavelengths taking different paths. In this way, parallel paths for the light are created, and the channel spacing on any given path can be great enough to allow a dispersion compensator as described to operate properly.

Figure 7:
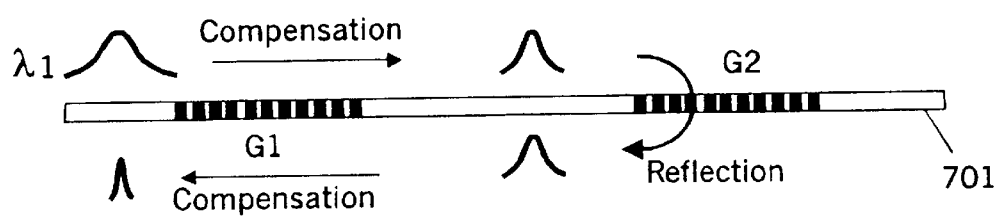
FIG. 7 illustrates a single-wavelength optical dispersion compensator according to the present invention, where light is passed through the dispersion compensating element twice to achieve enhanced compensation.

An improved configuration is shown in FIG. 7, where we assume that all channels require negative dispersion for compensation, requiring transmission at wavelengths slightly above the upper edge of the reflection band. Here, gratings in light path 701 work in pairs. For a given wavelength, $\lambda_1$, the first grating of a pair, G1, is used to compensate partially for the accumulated dispersion in the wavelength channel. The second grating, G2, is designed so that its reflection band includes the wavelength being compensated for by grating G1; thus, light associated with that channel will be reflected back to the first grating. The reflected signal is again partially compensated on the second pass through the first grating (for full net compensation). An optical circulator can be placed before G1 to redirect the reflected light pulses of the wavelength of interest back to the receiver for the system.

Figure 8:
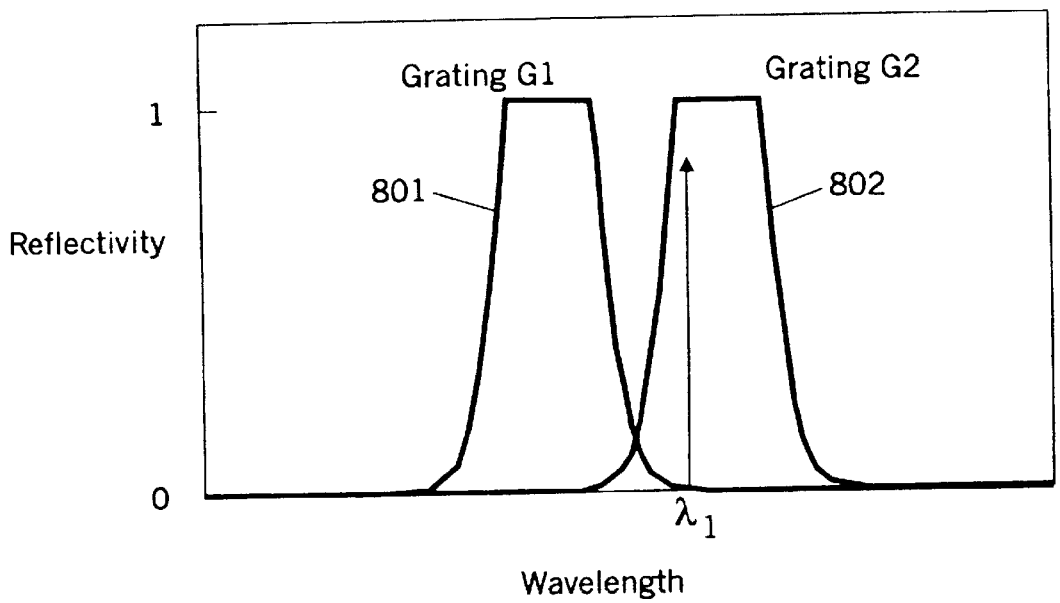
FIG. 8 is a reflectivity graph for the dispersion compensator of FIG. 7.

The principles of the dispersion compensator of FIG. 7 can be readily understood by observing the reflectivity graph of FIG. 8. Here, the reflection band of grating G1 is illustrated by curve 801 and the reflection band of grating G2 is illustrated by curve 802. Wavelength $\lambda_1$ is compensated by the negative dispersion introduced by being transmitted just on the high wavelength side of curve 801, while the light of wavelength $\lambda_1$ is reflected by grating G2 since is falls within reflection band curve 802.

Figure 9:
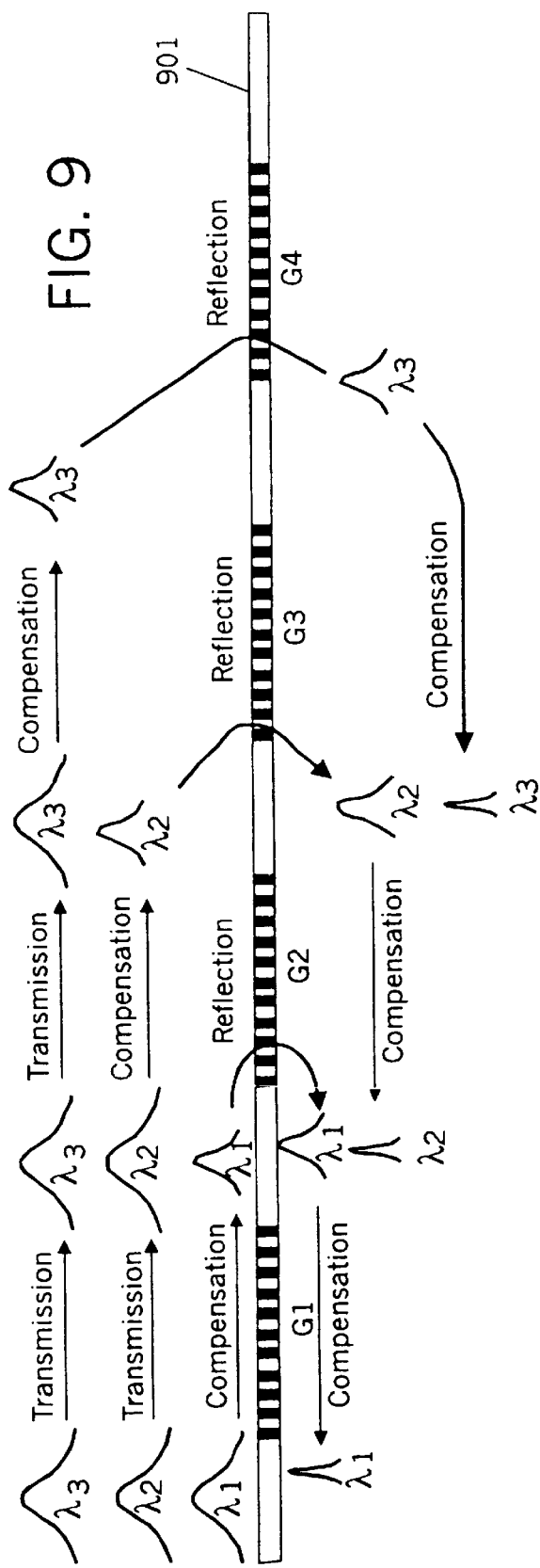
FIG. 9 illustrates a three-wavelength dispersion compensator in which gratings are connected in series according to the present invention.

The dispersion compensator shown in FIG. 7, as shown with only two gratings, can be used with an optical circulator to provide dispersion compensation for a single wavelength. However, the basic approach is most useful if extended to the case of multiple wavelengths and multiple gratings so that a truly broadband optical dispersion compensator is created. FIG. 9 illustrates a multiple wavelength dispersion compensator for three wavelengths, $\lambda_1$, $\lambda_2$, and $\lambda_3$. In FIG. 9, gratings G1, G2 and G3, disposed within optical fiber path 901, each compensate for one of the three wavelengths, and either transmits or reflects one or more of the other of the three wavelengths. Light of wavelength $\lambda_1$, is partially compensated by grating G1, reflected by G2, partially compensated again by G1, and returns to the optical circulator. Light of wavelength $\lambda_2$, is transmitted through G1, partially compensated by G2, reflected by G3, partially compensated again by G2, and transmitted back to the circulator through G1. Light of wavelength $\lambda_3$ is transmitted through gratings G1 and G2, partially compensated by G3, reflected by G4, partially compensated again by G3, and is finally transmitted, relatively unaffected, through gratings G2 and G1 back to the circulator. It should be noted that, since grating G4's only purpose is to reflect light back to the optical circulator through the other gratings, grating G4 could be replaced by a mirror.

Figure 10:
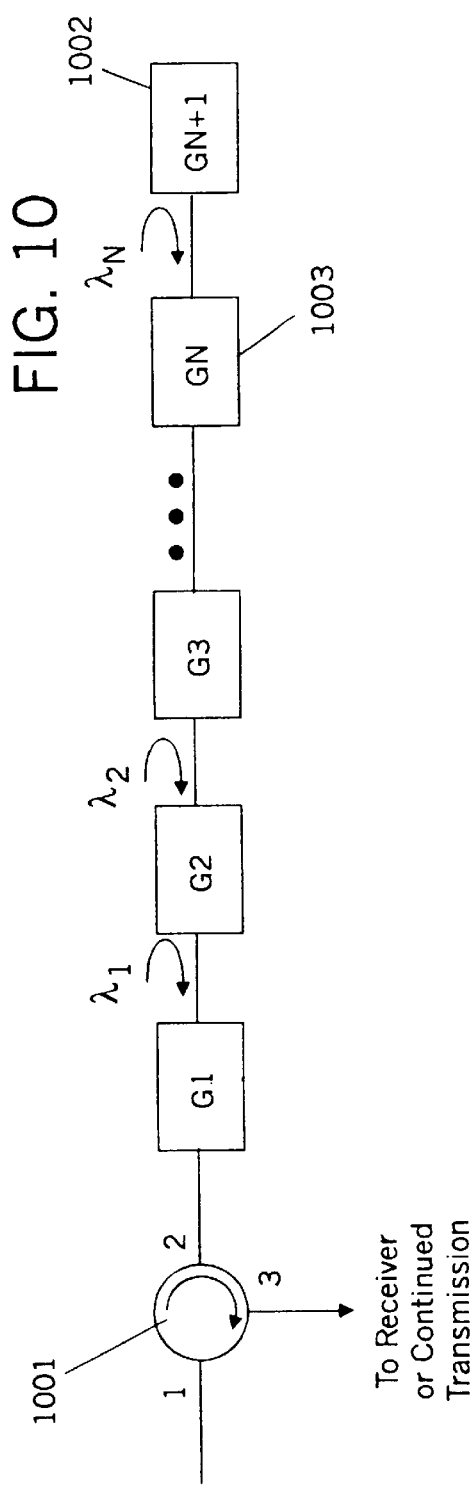
FIG. 10 shows a generalized block diagram of a multiple wavelength or broadband optical dispersion compensator according to the present invention that operates by the principles illustrated for the three-wavelength compensator of FIG. 9.

FIG. 10 illustrates the generalized case for a broadband compensator made up of multiple, cascaded, uniform FBG compensation elements. In FIG. 10, single-wavelength compensator elements are cascaded to produce a multiple-wavelength, adjustable compensator. It is assumed that the wavelengths used in the system to be compensated are well known and stable. We will designate $\lambda_1$ to be the shortest wavelength of the system, with increasing index corresponding to longer wavelengths, up to the longest wavelength of interest, $\lambda_N$. We assume that all wavelengths require negative dispersion for compensation, so that the pulse wavelength should be just above the long-wavelength reflection band edge of the compensating grating.

In FIG. 10, the optical signal enters through port 1 of optical circulator 1001, a three-port device that routes port 1 to port 2, port 2 to port 3, and port 3 to port 1. Optical circulators are well-known in the art. The signal exits port 2 and is incident on uniform fiber grating G1, with a reflection band optimized to compensate light of wavelength $\lambda_1$. The parameters of G1 (strength, length, apodization) are optimized as nearly as possible for half the ideal compensation of $\lambda_1$, and an adjustable strain transducer, such as that illustrated in FIG. 5, is used for fine adjustment to achieve this value. Other wavelengths are farther outside the band edge and therefore receive negligible dispersion (or reflection) from G1. All wavelengths then propagate to grating G2, which is set such that wavelength $\lambda_1$ lies within the reflection band, and light of that wavelength is reflected back toward G1, while $\lambda_2$ is optimized as nearly as possible for half compensation from G2 and all other wavelengths are transmitted with negligible dispersion. The reflected light of wavelength $\lambda_1$ is again compensated by G1, and transmitted through the circulator to port 3 and to the transmission system (for inline application) or to a detector (at a system terminal). Other wavelengths follow similar paths, with light of wavelength $\lambda_N$ half-compensated by grating GN, 1003, reflected by grating G(N+1), 1002, and again half-compensated by grating GN before being routed by the circulator to the detector. (A mirror could be used in place of the final grating.) A tunable filter or demultiplexer may be placed before port 1 of the circulator or after port 3 of the circulator to select the wavelength to be detected. The approach of FIG. 10 may be extended to the case where positive compensation is desired by operating on the longest wavelength first and working on the short wavelength side of the grating. For cases where both positive and negative dispersion are required, the light pulses can be split into positive and negative dispersion branches and compensated separately.

Figure 11:
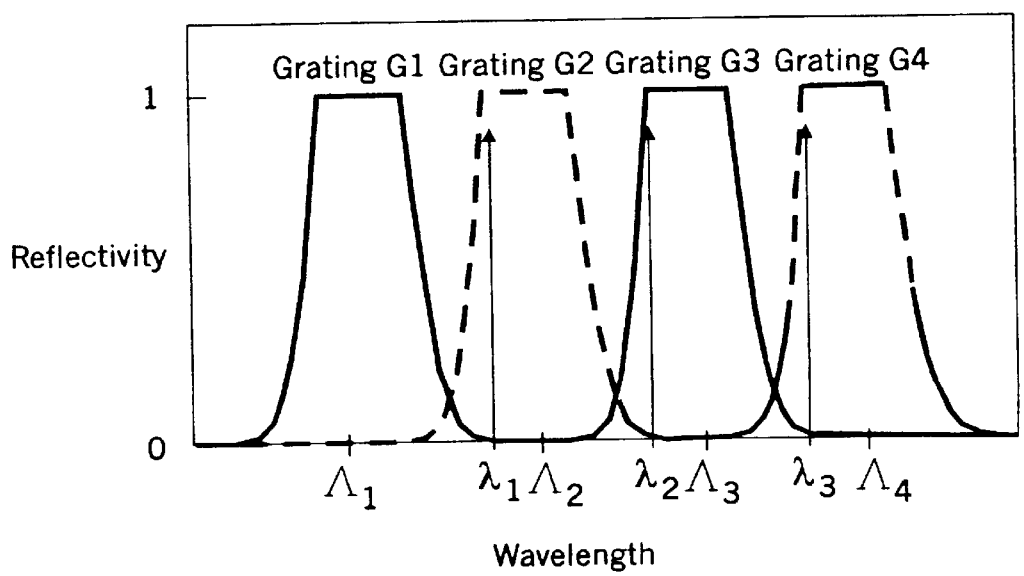
FIG. 11 is a reflectivity graph for a three-wavelength, four-grating, compensator like that illustrated in FIGS. 9 and 10.

A reflectivity graph for an example 3-wavelength system design is provided in FIG. 11. We assume three wavelengths on the ITU grid: 1550.116 nm, 1550.918 nm, and 1551.721 nm, corresponding to $\lambda_1$, $\lambda_2$, and $\lambda_3$, respectively. The ITU grid is defined by International Telecommunications Union (ITU) Recommendations G.692, the most recent version of which as of the filing date of this application is incorporated herein by reference. We assume that a Gaussian pulse is launched into a standard single-mode optical fiber at one of these wavelengths, which defines a channel of the system. The pulse is assumed to have a Full Width at Half Maximum (FWHM) pulse width of 50 ps, and is propagating in a Return-to-Zero (RZ) format, with an assumed data rate of 10 Gb/s (so that the bit interval is 100 ps). The pulse is dispersion broadened to approximately 136 ps FWHM due to propagation through a 100-km length of fiber with dispersion parameter 18 ps/nm-km. It then enters a grating system having characteristics such as pictured in FIG. 11.

The grating system uses four gratings, each with index modulation of 0.0015, length 5 cm, and Gaussian apodization function. The apodization function has the form $A(z)= \exp\{-\ln(2) * (2*(z-L/2)/(0.5*L))^2\}$, where z is the position along the grating and L is the grating length. This function multiplies the sinusoidal index variation of the grating to reduce the index modulation at the ends of the grating, which reduces sidelobes in the grating spectrum. The gratings have the following periods, resulting in reflections bands centered at frequencies $\Lambda_1$, $\Lambda_2$, $\Lambda_3$, and $\Lambda_4$, respectively:

Grating G1:533.67 nm, $\Lambda_1$=1549.96 nm
Grating G2:533.95 nm, $\Lambda_2$=1550.63 nm Grating G3:534.23 nm, Λ$_3$=1551.52 nm Grating G4:534.51 nm, Λ$_4$=1552.27 nm This system compensates for ITU grid wavelengths of 1550.116 nm, 1550.918 nm, and 1551.721 nm, which fall just outside of the reflection band of the compensating grating and within the reflection band of the next grating, as illustrated in FIG. 11. A person of ordinary skill in the art can readily extend this design to additional wavelengths. For instance, the next channel frequency to be added in order to create a four-wavelength system would be 1552.524 nm and the next grating in this case would have a period of 534.80 nm.

Figure 12:
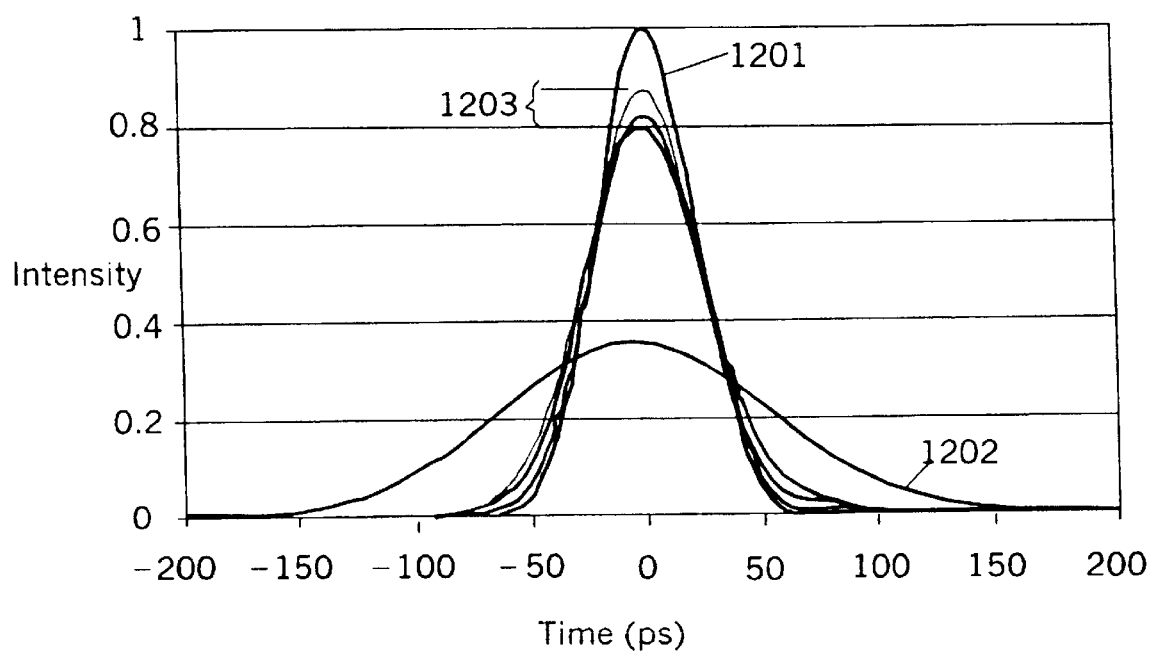
FIG. 12 is an intensity graph, which illustrates the dispersion compensation achieved through the use of the compensators of the present invention.

FIG. 12 is an intensity graph that illustrates how a five-grating system improves dispersion in a network with four channels. FIG. 12 shows the network input (unbroadened) Gaussian pulse, 1201, the dispersion-broadened pulse incident on the gratings, 1202, and the reflected pulses for the four channels of interest, 1203, where the broadened pulses 1202 are fed through a dispersion compensator based on serially cascaded gratings according to the invention. Losses in the circulator and material losses in the fiber gratings are neglected, and the intensities are normalized to the input pulse peak intensity. Observe that over 90% of the energy resides within the 100-ps bit interval of the compensated pulses, with a best-case peak intensity of 88% of the initial peak intensity.

The cascaded serial approach described so far may suffer from two detrimental effects. First, multipath interference effects may be produced by the small, but non-zero, reflection from the dispersion compensating grating. The cavity produced by these weak reflections from the compensating grating and the strong reflections from the reflective grating may produce transmission errors. This effect may be eliminated in the transmissive system of FIG. 6 by placing isolators between adjacent gratings. Also, increased channel spacing and careful attention to grating apodization may minimize the effect in the reflective system.

The second effect is out-of-band insertion loss produced by coupling to cladding modes. Cladding modes represent signal paths through the cladding on an optical fiber rather than through the fiber itself. Strong Bragg gratings are known to produce coupling to cladding modes at wavelengths located a few nanometers below the lower edge of the reflection band. This coupling produces undesirable insertion losses that may be greater than 60 dB for long, unjacketed fiber. Careful control of the recoating material properties and fiber design may be used to reduce these losses or shift the resonant wavelengths outside the band of interest.

Figure 13:
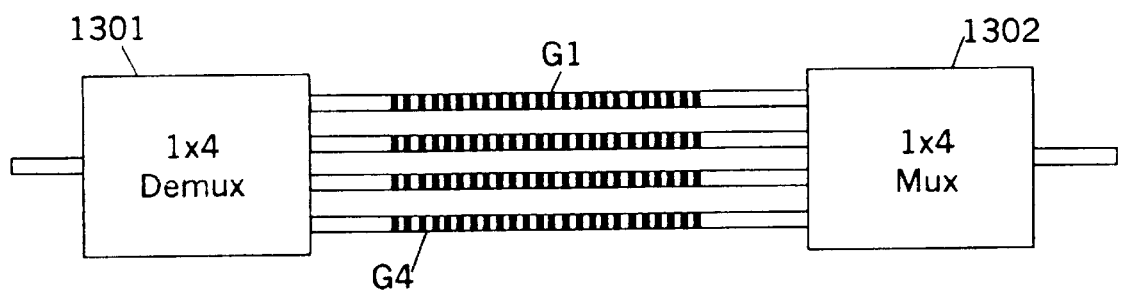
FIG. 13 shows a generalized block diagram of a four-wavelength or broadband optical dispersion compensator according to the present invention, where the gratings are connected in parallel.

A dispersion compensator that eliminates the two difficulties with cascaded gratings is pictured in FIG. 13. In the compensator of FIG. 13, a wavelength demultiplexer, 1301, (Demux) is used to separate the optical channels. Gratings are placed into the demultiplexed paths, allowing dynamic dispersion adjustment for the individual channels. G1 and G4 are labeled and correspond to G1 and G4 of a series cascaded system with at least five total gratings. This design trades the insertion losses produced by circulators or isolators required in the cascaded design for the insertion losses of the dumux and the wavelength division multiplexer, 1301, (Mux) required to recombine the channels. In addition, the tuning of a grating has no effect on adjacent channels in this case; in the cascaded case the tuning range of a grating is limited by the required reflection band of an adjacent channel. The parallel system also has the advantage of using only N gratings, as opposed to N+1 gratings. The advantages of the parallel system over the cascaded system make it the preferred system for many applications.

Figure 1:
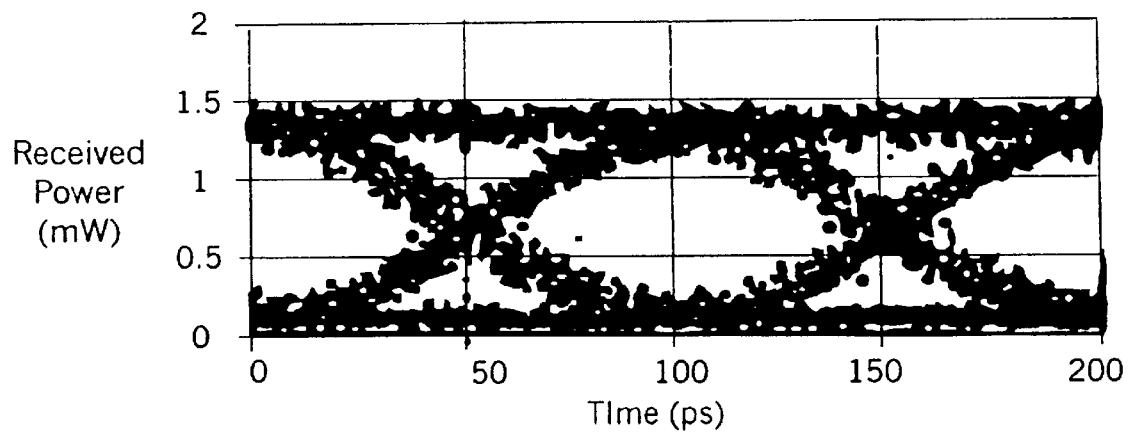
FIG. 1 shows an eye diagram for a signal in a nondispersive optical channel.
Figure 2:
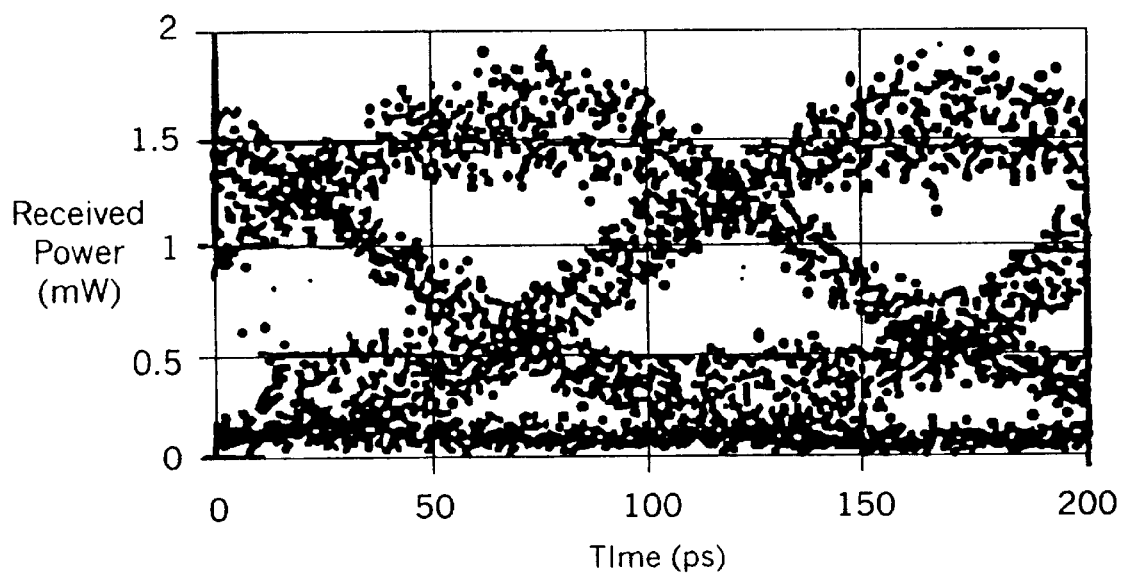
FIG. 2 shows an eye diagram for a signal in a dispersive optical channel where the invention is not in use.
Figure 3:
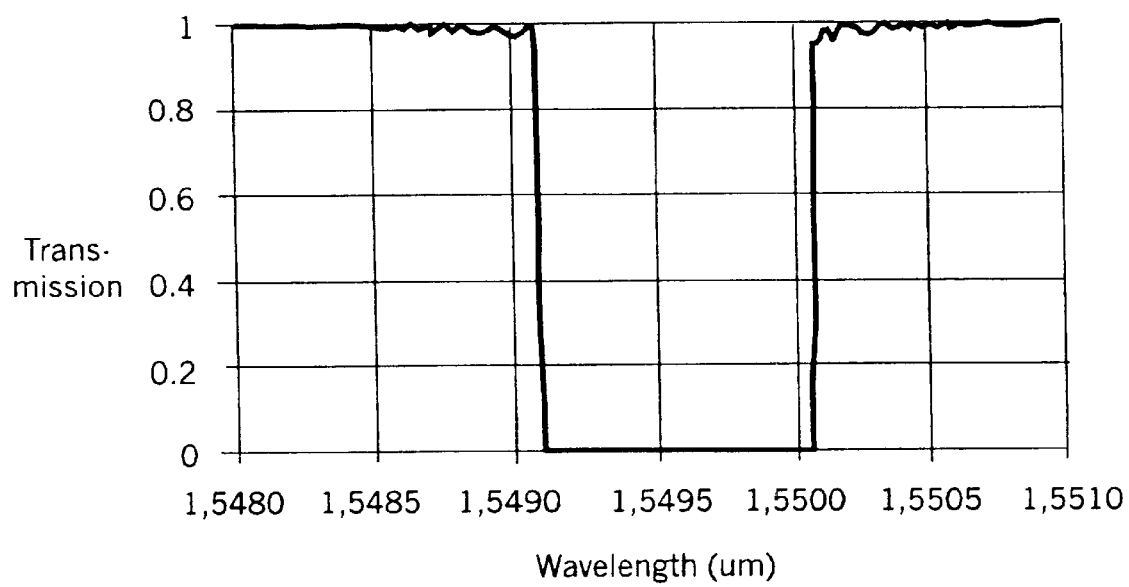
FIG. 3 shows transmission through a fixed, uniform, apodized fiber Bragg grating.
Figure 4:
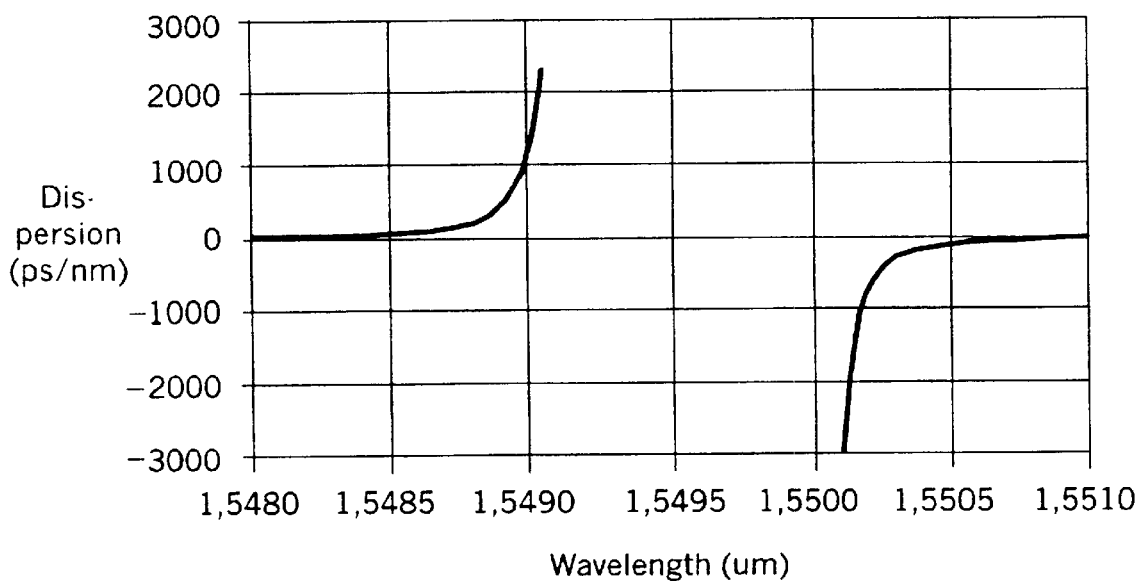
FIG. 4 shows dispersion in a fixed, uniform, apodized fiber Bragg grating.
Figure 14:
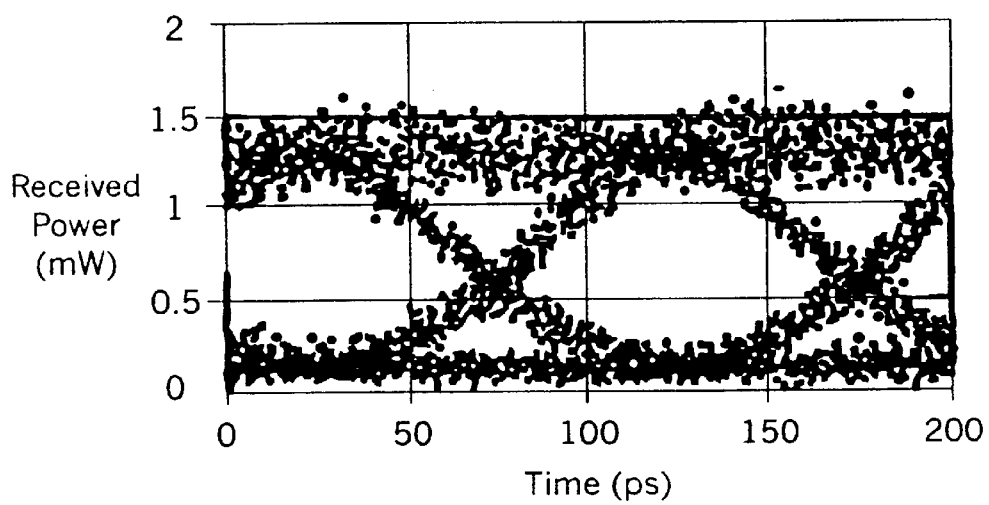
FIG. 14 is an eye diagram showing the effect of reduced dispersion made possible by a dispersion compensation element of the present invention.

FIG. 14 shows an eye diagram like that shown in FIGS. 1 and 2 for a 10 Gb/s signal, except that the dispersed signal of FIG. 2 has been transmitted through a single-channel dispersion compensator element according to the present invention. This experimental result demonstrates the use of the invention to compensate for system dispersion.

As previously described, the dispersion compensators are ideally adjusted dynamically, by a control system which includes a dispersion monitoring system so that feedback control can be provided. The invention includes a solution for dispersion monitoring that employs an electrical spectrum analysis. The electrical spectrum of a received signal is strongly dependent on the accumulated dispersion in the signal. More highly dispersed optical signals produce electrical signals in an opto-electronic (O/E) receiver with a greater fractional power at lower frequencies than non-dispersed signals. Thus, the relative power in a specific electrical frequency band may be used as a control signal for a dispersion compensator. For example, minimizing the accumulated dispersion will minimize the fractional power transmitted through a low-pass filter or maximize the fractional power through a high-pass filter; thus the error signals produced by such filtered power may be used to maintain the minimum dispersion point in a dynamically adjustable dispersion compensator.

In order to provide a robust, low-cost way to monitor dispersion, the invention makes use of a square-law, OQE receiver. Direct measurement of the frequency chirp induced on the optical signal by dispersion is impractical, since the square-law detector used in optical-to-electrical signal conversion eliminates phase information from the signal. The invention makes use of the temporal broadening property of dispersive systems. A single pulse propagating through a dispersive system will produce a broadened electrical response from the detector, which measures only the optical power, not the phase. This broadening of the pulse in the time domain indicates that the width of the electrical power spectrum is decreasing, and thus a larger fraction of the electrical power will be found at lower frequencies. According to an embodiment of the dispersion monitoring and control system, a voltage waveform is generated that is proportional to optical power and the power spectral density of the voltage waveform is determined. The performance of the system can be characterized by integrating the power spectral density from zero to a cutoff frequency ($f_c$). The resulting signal is defined to be:

$$P_{LF}(f_c) = \frac{\int_0^{f_c} |V(f)|^2 df}{\int_0^{\infty} |V(f)|^2 df}$$

where V(f) is the spectrum of the voltage signal from the detector. This signal is equivalent to the fractional power transmitted through an ideal low-pass filter with a cutoff frequency of $f_c$.

Figure 15:
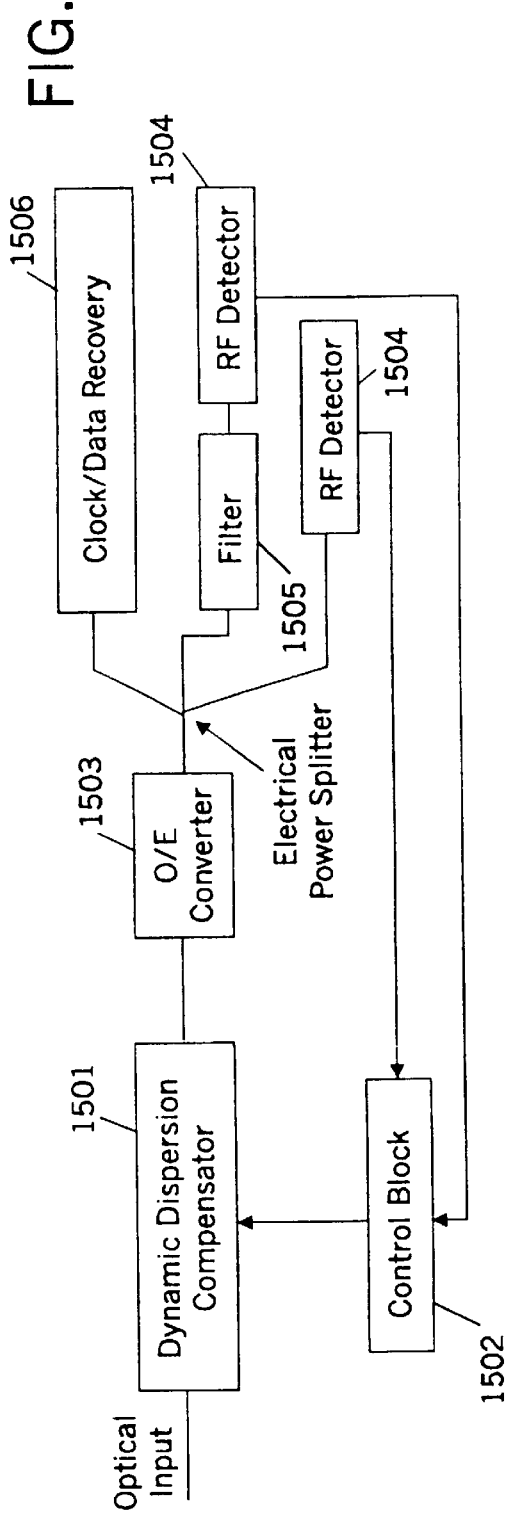
FIG. 15 is a block diagram illustrating one embodiment of the control system of the present invention.
Figure 16:
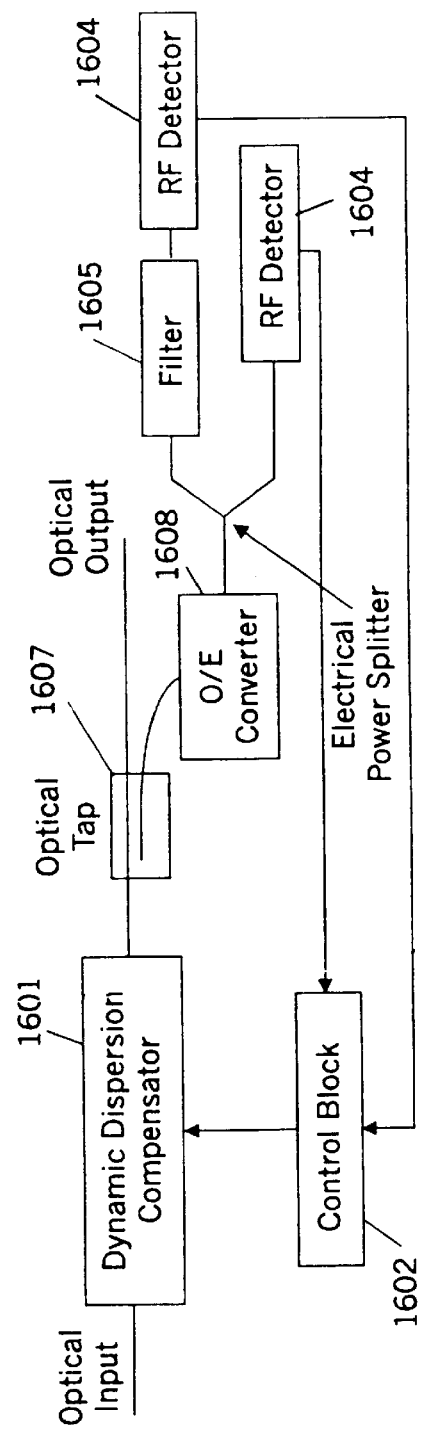
FIG. 16 is a block diagram illustrating another embodiment of the control system of the present invention.

FIGS. 15 and 16 show two embodiments of a dispersion monitoring and control system that works according to the principles described above. It should be noted that, although we describe the control system as being used in conjunction with the broadband dispersion compensators describe herein, it is a "stand-alone" system, in that it can work with any properly adapted dispersion compensating components that have a control system input. Each embodiment of the control system uses a filter to determine the fractional spectral power. If a low-pass filter is used, fractional power, $P_{LF}$ as characterized by the above equation, is minimized to minimize dispersion. If a high-pass filter is used, the limits of the integral in the numerator of the relation to determine $P_{LF}$ become $f_c$ to infinity, and the value should be maximized. One of ordinary skill in the art can also develop a system that works with a band-pass filter by only measuring dispersion in a specific band of frequencies.

FIG. 15 shows a block diagram of a system that is used at a termination point of an optical span. The network includes a dynamic dispersion compensator, 1501. O/E converter 1503 produces an electrical signal corresponding to the optical signal. In this case, the converter shares the dual purpose of producing signals for the control system, and providing a signal to the clock/data recovery system, 1506, of the optical network via the electrical splitter. Two identical RF spectral detectors are shown as 1504. One determines spectral power after the filter, 1505, and the other determines spectral power directly. Signals from each detector are fed to control block 1502 and the required division is performed to produce a control signal to be fed to the dispersion compensator 1501.

FIG. 16 shows essentially the same system, but for connection in the middle of an optical network span. Reference numbers in FIG. 16 correspond to those in FIG. 15 for the same components. In the case of FIG. 16, however, optical tap 1607 is used to provide a signal to O/E converter 1608. OIE converter 1608, unlike the converter in FIG. 15, does not provide any signal to a clock/date recovery system. Also, only a two-way electrical power splitter is required in the system of FIG. 16, as opposed to the three-way splitter used in the system of FIG. 15.

Figure 17:
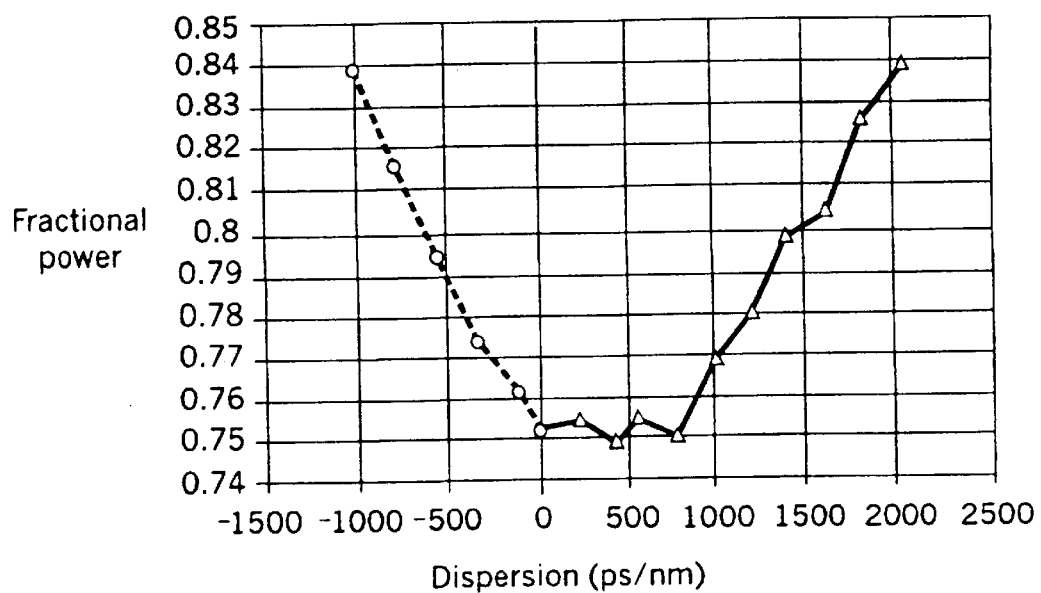
FIG. 17 shows a graphical representation of an error signal that is used by the monitoring and control system of the present invention.

FIG. 17 shows the error signal produced by the division of the band-limited power by the total power for a 10 Gb/s system where dispersion was introduced through varying lengths of optical fiber. The offset from zero dispersion is caused by dispersion inherent in the system with zero fiber length.

The control block measures this signal and provides feedback through the strain actuator to control the dispersion imparted by the grating to the optical signal at a specific wavelength. The control block can be designed to minimize the error signal shown in FIG. 17 through using any practical analog or digital control method. The particular mode of control would be determined by system requirements such as bandwidth and actuation method.

Multiple wavelength systems may be controlled by duplication of this basic system for each wavelength or by sequentially monitoring each channel through an optical switch connecting the tapped optical output from the channel to a single optical receiver and monitor/control circuit. The switch would be used to sequentially poll each channel, saving the expense of duplication of the RF circuitry.

A system like those shown in FIGS. 15 and 16 has been tested for signals with introduced dispersion of 0, 500, 1000, 1500, and 2000 ps/nm. It was observed that $P_{LF}$ increases with increasing dispersion for a given f for dispersion above. 500 ps/nm. By minimizing $P_{LF}$, the dispersion could therefore be minimized. For dispersion below 500 ps/nm, system impairment was small. The test system used a 10 Gb/s signal.

We have described specific embodiments of our invention, which provides adjustable dispersion compensators and a dispersion monitoring and control system. One of ordinary skill in the networking and/or electronics and optics arts will quickly recognize that the invention has numerous other embodiments. In fact, many implementations are possible. The following claims are in no way intended to limit the scope of the invention to the specific embodiments described.

We claim:

1. An adjustable optical dispersion compensating element for connection within an optical path, the compensating element comprising:

a uniform fiber Bragg grating; and a transducer coupled to the uniform fiber Bragg grating operable to deform the uniform fiber Bragg grating in response to a control signal so that dispersion for a dynamically selectable wavelength of light being transmitted through the optical path is reduced by transmission just outside a reflection band edge of the uniform fiber Bragg grating.

2. The optical dispersion compensating element of claim 1 wherein the transducer is operable to dynamically select the reflection band edge from between a short wavelength reflection band edge and a long wavelength reflection band edge.

3. An optical dispersion compensator comprising:

an optical circulator having connections for input and output optical fibers and for an optical path within the dispersion compensator;

a first uniform fiber Bragg grating connected within the optical path operable to compensate for dispersion at a specific wavelength by being tuned so that pulses of light of the specific wavelength are transmitted through the uniform fiber Bragg grating slightly outside a reflection band edge of the uniform fiber Bragg grating;

a transducer coupled to the first uniform fiber Bragg grating, the transducer responsive to a control signal so that the specific wavelength for the uniform fiber Bragg grating can be dynamically changed in response to the control signal; and a reflection element connected to the first uniform fiber Bragg grating for reflection of the light of the specific wavelength back to the first uniform fiber Bragg grating and to the optical circulator.

4. The dispersion compensator of claim 3 wherein the reflection element further comprises a mirror.

5. The dispersion compensator of claim 3 wherein the reflection element further comprises a second uniform fiber Bragg grating.

6. A multiple wavelength dispersion compensator comprising:

input and output connectors; and a plurality of cascaded uniform fiber Bragg gratings disposed between the input and output connectors, each uniform fiber Bragg grating for compensating for dispersion at a specific wavelength by being tuned so that light of the specific wavelength is transmitted through the uniform fiber Bragg grating slightly outside a reflection band edge of the uniform fiber Bragg grating.

7. The multiple wavelength dispersion compensator of claim 6 further comprising at least one transducer coupled to at least one uniform fiber Bragg grating, the transducer responsive to a control signal so that the specific wavelength for the uniform fiber Bragg grating can be dynamically changed in response to the control signal.

8. The multiple wavelength dispersion compensator of claim 7 wherein the transducer is also operable to dynamically select the reflection band edge from between a short wavelength reflection band edge and a long wavelength reflection band edge.

9. A dispersion compensator comprising:

input and output connectors;

an optical circulator connected to the input and output connectors; and a plurality of cascaded uniform fiber Bragg gratings connected to the optical circulator, at least one pair of the uniform fiber Bragg gratings for compensating for dispersion at a specific wavelength by a first uniform fiber Bragg grating of the pair being tuned so that light of the specific wavelength is transmitted through the first uniform fiber Bragg grating of the pair slightly outside a reflection band edge of the first uniform fiber Bragg grating while a second uniform fiber Bragg grating of the pair is tuned so that the light of the specific wavelength is reflected back through the first uniform fiber Bragg grating and to the optical circulator.

10. The dispersion compensator of claim 9 further comprising at least two transducers, each transducer coupled to one of the uniform fiber Bragg gratings of the pair of uniform fiber Bragg gratings, the transducers responsive to control signals so that the specific wavelength can be dynamically changed in response to the control signals.

11. The dispersion compensator of claim 10 wherein the transducer for the first uniform fiber Bragg grating of the pair is also operable to dynamically select the reflection band edge from between a short wavelength reflection band edge and a long wavelength reflection band edge.

12. An N-wavelength optical dispersion compensator comprising:

a 1 by N demultiplexer having an input connector;

an N by 1 multiplexer having an output connector; and

N parallel, uniform fiber Bragg gratings disposed between the demultiplexer and the multiplexer, each uniform fiber Bragg grating for compensating for dispersion at a specific wavelength by being tuned so that pulses of light of the specific wavelength are transmitted through the uniform fiber Bragg grating slightly outside a reflection band edge of the uniform fiber Bragg grating.

13. The dispersion compensator of claim 12 further comprising at least one transducer coupled to at least one uniform fiber Bragg grating, the transducer responsive to a control signal so that the specific wavelength for the uniform fiber Bragg grating can be dynamically changed in response to the control signal.

14. The dispersion compensator of claim 13 wherein the transducer is also operable to dynamically select the reflection band edge from between a short wavelength reflection band edge and a long wavelength reflection band edge.

15. An optical dispersion compensation system having an optical fiber input, the dispersion compensation system comprising:

a dispersion compensator connected to the input, including, at least one uniform fiber Bragg grating for compensating for dispersion at a specific wavelength by being tuned so that light of the specific wavelength is transmitted through the uniform fiber Bragg grating slightly outside a reflection band edge of the uniform fiber Bragg grating, and at least one transducer coupled to the uniform fiber Bragg grating, the transducer responsive to a control signal so that the specific wavelength for the uniform fiber Bragg grating can be dynamically changed in response to the control signal; and a control system connected to the transducer, the control system including a opto-electronic receiver coupled to the dispersion compensator and a filter connected to the opto-electronic receiver, the control system for producing the control signal by determining the fractional spectral power transmitted through the filter.

16. The system of claim 15 wherein the filter is a low-pass filter.

17. The system of claim 15 wherein the filter is a high-pass filter.

18. The system of claim 15 wherein the filter is a band-pass filter.

19. A method of compensating for dispersion within an optical system, the method comprising the steps of:

receiving pulses of light characterized by a selected wavelength from an input;

compensating for dispersion at the selected wavelength by passing the pulses of light through a uniform fiber Bragg grating that is tuned so that the selected wavelength is slightly outside a reflection band edge of the uniform fiber Bragg grating; and transmitting the pulses of light to an output.

20. The method of claim 19 wherein the uniform fiber Bragg grating is dynamically tuned by the application of a control signal to a transducer that is coupled to the uniform fiber Bragg grating.

21. The method of claim 20 wherein the transducer is operable to dynamically select the reflection band edge from between a short wavelength reflection band edge and a long wavelength reflection band edge in response to the control signal.

22. A method of compensating for dispersion within an optical system, the method comprising the steps of:

receiving light characterized by multiple selected wavelengths from an input;

compensating for dispersion at each of the selected wavelengths by passing light of the selected wavelength through a uniform fiber Bragg grating that is tuned so that the selected wavelength is slightly outside a reflection band edge of the uniform fiber Bragg grating; and transmitting the pulses of light to an output.

23. The method of claim 22 wherein the uniform fiber Bragg grating is dynamically tuned by the application of a control signal to a transducer that is coupled to the uniform fiber Bragg grating.

24. The method of claim 23 wherein the strain transducer is operable to dynamically select the reflection band edge from between a short wavelength reflection band edge and a long wavelength reflection band edge in response to the control signal.

25. Apparatus for compensating for dispersion within an optical system, the apparatus comprising:

means for receiving pulses of light characterized by a selected wavelength from an input;

tuned uniform fiber Bragg grating means connected to the means for receiving for compensating for dispersion at the selected wavelength; and means for transmitting the pulses light to an output, the means for transmitting connected to the uniform fiber Bragg grating means.

26. Apparatus for compensating for dispersion within an optical system, the apparatus comprising:

means for receiving light characterized by a plurality of selected wavelengths from an input;

tuned uniform fiber Bragg grating means connected to the means for receiving for compensating for dispersion at each of the selected wavelengths; and means for transmitting the light to an output, the means for transmitting connected to the uniform fiber Bragg grating means.

* * * * *